US012349850B1

(12) United States Patent
Sang

(10) Patent No.: US 12,349,850 B1
(45) Date of Patent: Jul. 8, 2025

(54) MOP BUCKET

(71) Applicant: Shaohua Sang, Xianning (CN)

(72) Inventor: Shaohua Sang, Xianning (CN)

( * ) Notice: Subject to any disclaimer, the term of this patent is extended or adjusted under 35 U.S.C. 154(b) by 0 days.

(21) Appl. No.: 18/987,003

(22) Filed: Dec. 19, 2024

(30) Foreign Application Priority Data

Dec. 5, 2024 (CN) ......................... 202423018439.5

(51) Int. Cl.
*A47L 13/59* (2006.01)
*B08B 1/16* (2024.01)
*B08B 3/02* (2006.01)

(52) U.S. Cl.
CPC .............. *A47L 13/59* (2013.01); *B08B 1/165* (2024.01); *B08B 3/02* (2013.01)

(58) Field of Classification Search
CPC ................................. A47L 13/58; A47L 13/59
USPC ............................. 15/260, 261, 116.1, 119.1
See application file for complete search history.

(56) References Cited

U.S. PATENT DOCUMENTS 11,337,578 B2 5/2022 Huang
11,717,131 B2 8/2023 Huang
11,950,738 B2 4/2024 Zhuang
2019/0274516 A1 9/2019 Dai
2020/0229672 A1* 7/2020 Huang .................... A47L 13/59
2022/0095878 A1 3/2022 Zhang

FOREIGN PATENT DOCUMENTS

CN 107898408 A * 4/2018 ............ A47L 13/58
CN 112971658 A * 6/2021
CN 215777882 U 2/2022
CN 115245293 A * 10/2022
CN 115429180 A * 12/2022

OTHER PUBLICATIONS

Translation CN112971658A (Year: 2021).*
Translation CN107898408A (Year: 2018).*
Translation CN115429180A (Year: 2022).*
Translation CN115245293A (Year: 2022).*

* cited by examiner

*Primary Examiner* — Tom Rodgers

(57) ABSTRACT

Disclosed is a mop bucket, including: a bucket body, having a chamber with an opening at a top, wherein the chamber is provided with first and second partition plates to separate the chamber into a dirty water chamber, a movable chamber, and a clean water chamber; a mounting frame, mounted at the top of the bucket body and provided with a first operation opening communicated with the movable chamber; and a cleaning mechanism, including a first scraper plate provided above the first partition plate and inclined toward the dirty water chamber, a water supply assembly, and a water spray pipe provided above the first scraper plate, wherein the water supply assembly is used to communicate with the clean water chamber and the water spray pipe to spray clean water toward the mop in the movable chamber by the water spray pipe. The practicability of the mop bucket is effectively improved.

10 Claims, 6 Drawing Sheets

MOP BUCKET

CROSS REFERENCE TO RELATED APPLICATION

This application claims priority benefit of Chinese patent Application No. 202423018439.5, filed on Dec. 5, 2024, and the entire contents of which are incorporated herein by reference.

TECHNICAL FIELD

The present invention relates to the field of household cleaning, and in particular, to a mop bucket.

BACKGROUND

Among existing cleaning devices, a mop is a common tool widely used in household, commercial and industrial cleaning fields. A mop is usually composed of a mop rod and a mop head, where the mop head is composed of a series of replaceable mop cloths or mop ropes for wiping and cleaning the floor. Cleanliness and moisture control of the mop head are key factors in ensuring cleaning results. However, existing mop designs still have some problems during the cleaning process, especially in terms of mop moisture control.

Most conventional mop buckets include a clean water chamber and a dirty water chamber. The clean water chamber is used to store clean water, while the dirty water chamber is used to collect dirty water accumulated on the mop head during the cleaning process. Although the requirement of daily cleaning may be basically met by this structure, this structure has major problems during the use process in that when a mop head enters a dirty water chamber for cleaning, the mop head always has residual dirty water in the dirty water chamber; and when the mop enters a clean water chamber again, the dirty water is brought into the clean water chamber, which causes water pollution and affects subsequent cleaning.

SUMMARY

A primary objective of the present invention is to provide a mop bucket, which aims to improve the practicability of the conventional mop bucket.

To achieve the objective, the present invention provides a mop bucket, which includes: a bucket body, wherein the bucket body has a chamber with an opening at a top, and the chamber is provided with a first partition plate and a second partition plate to separate the chamber into a dirty water chamber, a movable chamber, and a clean water chamber;

- a mounting frame, wherein the mounting frame is mounted at the top of the bucket body and is provided with a first operation opening communicated with the movable chamber; and
- a cleaning mechanism, wherein the cleaning mechanism includes a first scraper plate provided above the first partition plate and inclined toward the dirty water chamber, a water supply assembly, and a water spray pipe provided above the first scraper plate, the water supply assembly is used to communicate with both the clean water chamber and the water spray pipe to spray clean water in the clean water chamber toward the mop in the movable chamber by the water spray pipe.

Optionally, the water supply assembly includes a mounting shell provided at a bottom of the mounting frame, a water pumping device arranged in the mounting shell, and a main control module electrically connected to the water pumping device, and the water pumping device is communicated with both the water spray pipe and the clean water chamber by a conduit.

Optionally, the main control module includes a main control board provided in the mounting shell and a key connected to the main control board, the key is mounted on the mounting shell, and the bucket body is provided with an operation hole corresponding to the key.

Optionally, the mounting frame is provided with a mounting groove communicated with the dirty water chamber, one side of the first scraper plate is fixed in the mounting groove by a rotating shaft, and the other side extends out of the mounting groove and is positioned above the movable chamber.

Optionally, a first abutment plate is protrudingly provided above the first scraper plate, and a second abutment plate cooperating with the first abutment plate is protrudingly provided on a mounting frame on one side of the mounting groove close to the dirty water chamber.

Optionally, at least one positioning groove is provided at a bottom of the first scraper plate, and a positioning protrusion cooperating with the positioning groove is protrudingly provided on a bottom wall of the mounting groove.

Optionally, the mop bucket further includes a cover body arranged on the mounting frame, the cover body is arranged above the water spray pipe, and the cover body is provided with an operation opening at a position corresponding to the first operation opening.

Optionally, the mounting frame and the cover body are provided with a second operation opening communicated with the dirty water chamber, and a second scraper plate inclined towards the dirty water chamber is provided between the first operation opening and the second operation opening of the cover body.

Optionally, the mop bucket further includes a filter bin, wherein the filter bin is mounted in the second operation opening of the cover body and is received below the second scraper plate.

Optionally, the mop bucket further includes a touch switch electrically connected to the main control board, and the touch switch is arranged on a peripheral wall of the first operation opening of the mounting frame.

Optionally, a drainage valve communicated with both the dirty water chamber and the movable chamber is provided at the bottom of the bucket body.

Optionally, at least one water pouring opening is provided on the top of the bucket body.

Optionally, the water supply assembly includes a manual water pump provided in the movable chamber, and the manual water pump is communicated with both the water spray pipe and the clean water chamber by a conduit.

The mop bucket according to the present invention achieves an efficient and convenient cleaning function by the coordinated work of a bucket body, a mounting frame, and a cleaning mechanism. Specifically, a first partition plate and a second partition plate are arranged in the bucket body, which separate a chamber into a dirty water chamber, a movable chamber and a clean water chamber, and can effectively isolate dirty water from clean water to avoid cross contamination. When in use, a user may operate a mop in the movable chamber by a first operation opening on the mounting frame. The cleaning mechanism includes a first scraper plate positioned above the first partition plate, a water supply assembly and a water spray pipe. The water supply assembly is used to spray clean water from the clean water chamber to the mop in the movable chamber by the water spray pipe. Specifically, when the mop is inserted into the movable chamber, the water spray pipe sprays water toward the mop, thereby cleaning the dirty water and dirt on the mop. Meanwhile, the first scraper plate below the water spray pipe scrapes and cleans the dirty water and dirt on the mop, and the first scraper plate is inclined toward the dirty water chamber, which helps to remove the dirty water or dirt on the mop and guide the dirty water or dirt into the dirty water chamber, thereby effectively maintaining the cleanliness of the mop and avoiding excessive contamination on the clean water in the clean water chamber by the mop during use. Therefore, the practicality of the mop bucket is effectively improved.

BRIEF DESCRIPTION OF DRAWINGS

To more clearly illustrate the technical solutions in the embodiments of the present invention or in the prior art, the drawings required to be used in the description of the embodiments or the prior art are briefly introduced below. It is obvious that the drawings in the description below are only some embodiments of the present invention, and those of ordinary skill in the art can obtain other drawings according to structures illustrated in these drawings without creative efforts.

DESCRIPTIONS OF REFERENCE NUMERALS

Figure 1:
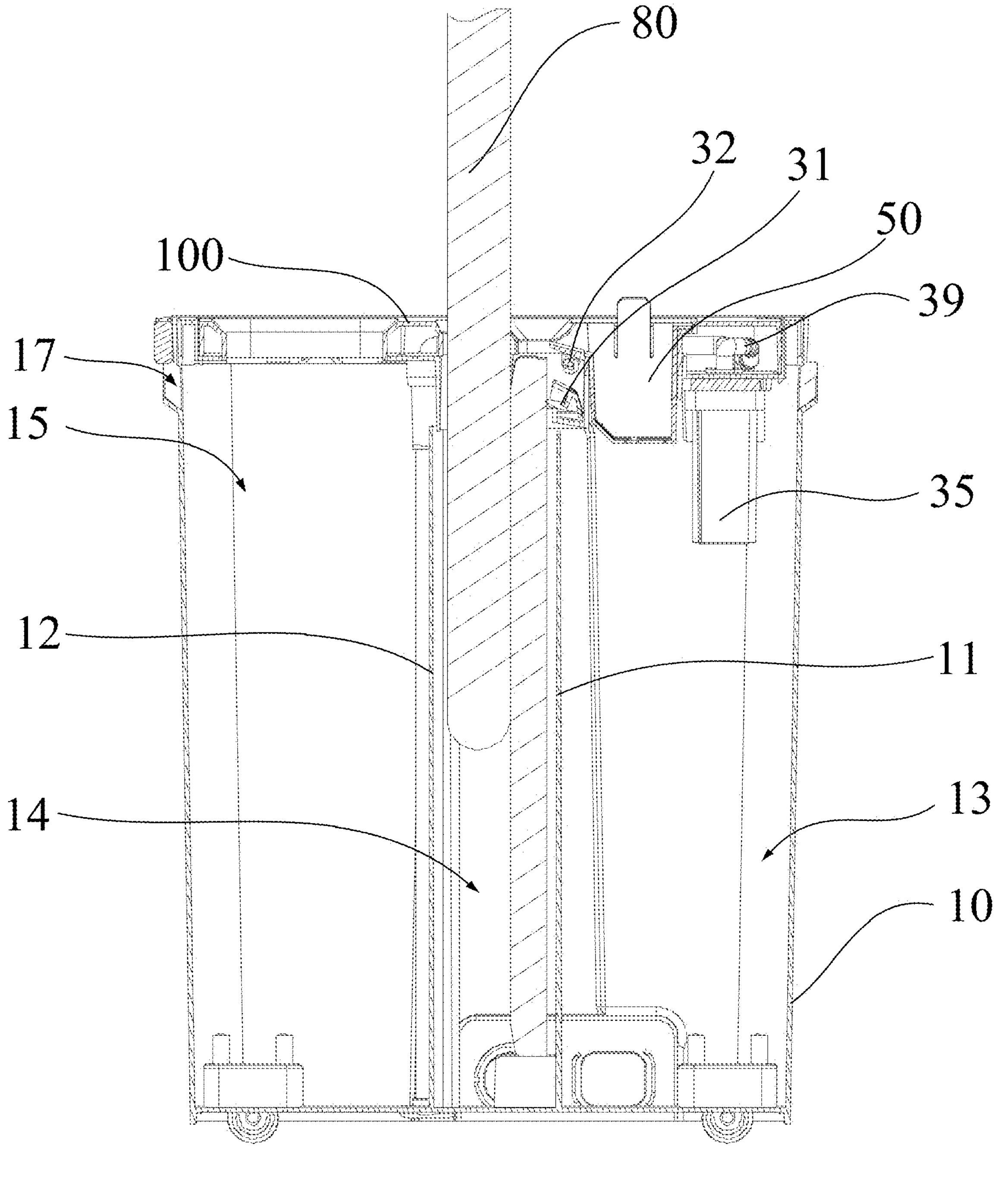
FIG. 1 is a schematic diagram of a cross-sectional structure of a mop bucket according to the present invention in use.

: bucket body; 11: first partition plate; 12: second partition plate; 13: dirty water chamber; 14: movable chamber; 15: clean water chamber; 16: operation hole; 17: water outlet; 20: mounting frame; 21: first operation opening; 22: second operation opening; 23: third operation opening; 24: fixing groove; 25: limiting groove; 26: mounting space; 27: mounting groove; 271: positioning protrusion; 28: second abutment plate; 31: first scraper plate; 311: positioning groove; 312: first abutment plate; 32: water spray pipe; 321: water spray hole; 322: closed end; 323: fixing part; 324: water inlet end; 35: mounting shell; 36: water pumping device; 37: main control board; 38: key; 39: conduit; 40: cover body; 41: second scraper plate; 50: filter bin; 60: touch switch; 70: drainage valve; 80: mop; and 90: manual water pump.

DETAILED DESCRIPTION OF EMBODIMENTS

The technical solutions in the embodiments of the present invention will be clearly and completely described below with reference to the drawings in the embodiments of the present invention. It is apparent that the described embodiments are only some, but not all, embodiments of the present invention. Based on the embodiments of the present invention, all other embodiments obtained by those of ordinary skill in the art without creative efforts fall within the protection scope of the present invention.

It should be noted that, if directional indications (such as upper, lower, left, right, front and rear) are involved in the embodiments of the present invention, the directional indications are only used to explain the relative positional relationships, the motion situations and the like between individual components under a certain pose (as shown in the drawings), and if the certain pose is changed, the directional indications are changed accordingly.

In addition, if there are descriptions relating to "first", "second" and the like in the embodiments of the present utility model, the descriptions of "first", "second" and the like are for descriptive purposes only and are not to be construed as indicating or implying relative importance thereof or implicitly indicating the quantities of the indicated technical features. Thus, a feature defined by "first" or "second" may explicitly or implicitly include at least one such feature. In addition, "and/or" appearing herein is meant to include three parallel solutions, and taking "A and/or B" as an example, it includes solution A, or solution B, or both solution A and solution B. In addition, the technical solutions among various embodiments may be combined with each other, however, this combination must be based on that it can be realized by those of ordinary skill in the art. When the combination of the technical solutions is contradictory or cannot be realized, such a combination of the technical solutions should not be considered to exist, and is not within the protection scope of the present invention.

The present invention provides a mop bucket.

In an embodiment of the present invention, as shown in FIGS. 1 to 7, the mop bucket includes: a bucket body 10, wherein the bucket body 10 has a chamber with an opening at a top, and the chamber is provided with a first partition plate 11 and a second partition plate 12 to separate the chamber into a dirty water chamber 13, a movable chamber 14, and a clean water chamber 15;

- a mounting frame 20, wherein the mounting frame 20 is mounted at the top of the bucket body 10 and is provided with a first operation opening 22 communicated with the movable chamber 14; and
- a cleaning mechanism, wherein the cleaning mechanism includes a first scraper plate 31 provided above the first partition plate 11 and inclined toward the dirty water chamber 13, a water supply assembly mounted on the mounting frame 20, and a water spray pipe 32 provided above the first scraper plate 31, the water supply assembly is used to communicate with both the clean water chamber 15 and the water spray pipe 32 to spray clean water in the clean water chamber 15 toward the mop 80 in the movable chamber 14 by the water spray pipe 32.

In this embodiment, the bucket body 10 functions to accommodate and support various components of the entire mop bucket and provide stable structural support. The bucket body 10 separates a chamber into three independent functional areas by using the first partition plate 11 and the second partition plate 12. Specifically, the first partition plate 11 is positioned between the dirty water chamber 13 and the movable chamber 14, and the second partition plate 12 is positioned between the movable chamber 14 and the clean water chamber 15. The dirty water chamber 13 is used to collect the dirty water generated by the mop 80 during the cleaning process and clean the mop 80, and ensures that the dirty water and clean water are separated to the greatest extent to avoid cross contamination. The movable chamber 14 is used to clean and store the mop 80 to be cleaned, so as to keep the mop 80 clean and convenient to store. The clean water chamber 15 is used to store clean water for use in subsequent cleaning processes, which prevents the clean water from mixing with dirty water.

The mounting frame 20 is used to provide mounting and operation space for the cleaning mechanism to ensure connectivity of the chambers and achievement of the cleaning function. Specifically, the mounting frame 20 is fixed to a top of the bucket body 10, and is provided with a first operation opening 21 communicated with the movable chamber 14. The user can treat the mop 80 in the movable chamber by the first operation opening 21, thereby effectively avoiding mutual contamination between the chambers.

In addition, the mounting frame 20 is further provided with a second operation opening 22 communicated with the dirty water chamber 13 and a third operation opening 23 communicated with the clean water chamber 15, so as to facilitate the cleaning operation of the corresponding chamber by the user.

The cleaning mechanism is used to clean dirty water and dirt on the mop 80 to ensure the cleanliness of the mop 80. Specifically, the first scraper plate 31 is arranged above the first partition plate 11 and is inclined towards the dirty water chamber 13, so that the dirty water and the dirt on the mop 80 are guided to the dirty water chamber 13, the dirty water is effectively prevented from accumulating on the mop 80, and the moisture retention of the mop 80 in the cleaning process is reduced. The water supply assembly is used to convey clean water from the clean water chamber 15 to the water spray pipe 32, and the water spray pipe 32 sprays the clean water onto the mop 80 in the movable chamber 14 to complete the cleaning of the mop 80. Since the water spray pipe 32 is arranged above the first scraper plate 31, the mop 80 is inserted into the movable chamber 14 and is rinsed with clean water and cleaned by the first scraper plate 31 to remove dirty water and dirt, thereby effectively maintaining the cleanliness of the mop 80.

The mop bucket according to the present invention achieves an efficient and convenient cleaning function by the coordinated work of the bucket body 10, the mounting frame 20, and the cleaning mechanism. Specifically, the first partition plate 11 and the second partition plate 12 are arranged in the bucket body 10, which separate a chamber into the dirty water chamber 13, the movable chamber 14 and the clean water chamber 15, and can effectively isolate dirty water from clean water to avoid cross contamination. When in use, a user may operate the mop 80 in the movable chamber 14 by the first operation opening 21 on the mounting frame 20. The cleaning mechanism includes a first scraper plate 31 positioned above the first partition plate 11, a water supply assembly positioned on the mounting frame 20, and a water spray pipe 32. The water supply assembly is used to spray clean water from the clean water chamber 15 to the mop 80 in the movable chamber 14 by the water spray pipe 32. Specifically, when the mop 80 is inserted into the movable chamber 14, the water spray pipe 32 sprays water toward the mop 80, thereby cleaning the dirty water and dirt on the mop 80. Meanwhile, the first scraper plate 31 below the water spray pipe 32 scrapes and cleans the dirty water and dirt on the mop 80, and the first scraper plate 31 is inclined toward the dirty water chamber 13, which helps to remove the dirty water or dirt on the mop 80 and guide the dirty water or dirt into the dirty water chamber 13, thereby effectively maintaining the cleanliness of the mop 80 and avoiding excessive contamination on the clean water in the clean water chamber 15 by the mop 80 during use. Therefore, the practicality of the mop bucket is effectively improved.

Further, the water spray pipe 32 is provided with a plurality of water spray holes 321, and the plurality of water spray holes 321 are arranged at intervals along a length direction of the water spray pipe 32.

Further, the water spray pipe 32 includes a closed end 322 and a water inlet end 324 communicated with the water pumping device 36, the closed end 322 is provided with a fixing part 323, the mounting frame 20 is provided with a fixing groove 24 adapted to the fixing part 323, and the fixing part 323 is fixed in the fixing groove 24, thereby ensuring the uniformity and stability of the spray effect.

In addition, the fixed design of the closed end 322 not only enhances the firmness of the structure, but also avoids the possible loose connection between the water pumping device 36 and the water spray pipe 32, thereby ensuring that clean water can be stably sprayed onto the surface of the mop 80 by the water spray pipe 32. This design may also effectively prevent water pipes from being damaged or leaking due to external forces, thereby extending the service life of the device. As a whole, this structural design simplifies mounting and maintenance operations and further improves the reliability and durability of the mop bucket.

Further, the mounting frame 20 is provided with a limiting groove 25, and the closed end 322 of the water spray pipe 32 is positioned in the limiting groove 25. The limiting groove 25 is used to provide additional fixing support for the closed end 322 of the water spray pipe 32 to prevent the water spray pipe 32 from being displaced or falling off during use. The arrangement of the limiting groove 25 ensures that the water spray pipe 32 can remain stable at a predetermined position, which avoids the displacement of the water spray pipe 32 due to improper operation or external interference, affecting the spray effect or causing other potential structural problems.

Meanwhile, the use of the limiting groove 25 also ensures that the water spray pipe 32 is accurately positioned when the mop bucket is working, so that the spray direction of clean water is more precise, the position deviation caused by the swing of the water spray pipe 32 is avoided, and the efficiency and uniformity of the spray system is ensured.

Further, as shown in FIGS. 1 to 6, the water supply assembly includes a mounting shell 35 provided at a bottom of the mounting frame 20, a water pumping device 36 arranged in the mounting shell 35, and a main control module electrically connected to the water pumping device 36, and the water pumping device 36 is communicated with both the water spray pipe 32 and the clean water chamber 15 by a conduit 39. In this embodiment, the mounting shell 35 is used to provide a stable mounting platform for the water pumping device 36, which ensures that the water pumping device 36 is not loosened or displaced due to vibration or external force during long-term use. The water pumping device 36, serving as a core power source of the water flow, can transport the clean water in the clean water chamber 15 to the water spray pipe 32 through the conduit 39, and spray the water to the mop 80 by the water spray holes. The connection of the conduit 39 ensures smooth and stable water flow, and avoids water flow interruption or uneven spraying.

The main control module controls the working state of the water pumping device 36 by an electrical connection. The user can start or stop the water pumping device 36 by operating the main control module, thereby controlling the spraying of the water flow. During the cleaning process, the user only needs to simply operate the main control module to automatically spray clean water onto the mop 80, thereby helping to perform the cleaning work more effectively.

Further, the mounting frame 20 is recessed to form a mounting space 26, and the conduit 39 is communicated with both the clean water chamber 15 and the mounting shell 35 by the mounting space 26, thereby avoiding interference between the conduit 39 and other components and ensuring the safety and stability of the conduit 39 during use.

Figure 8:
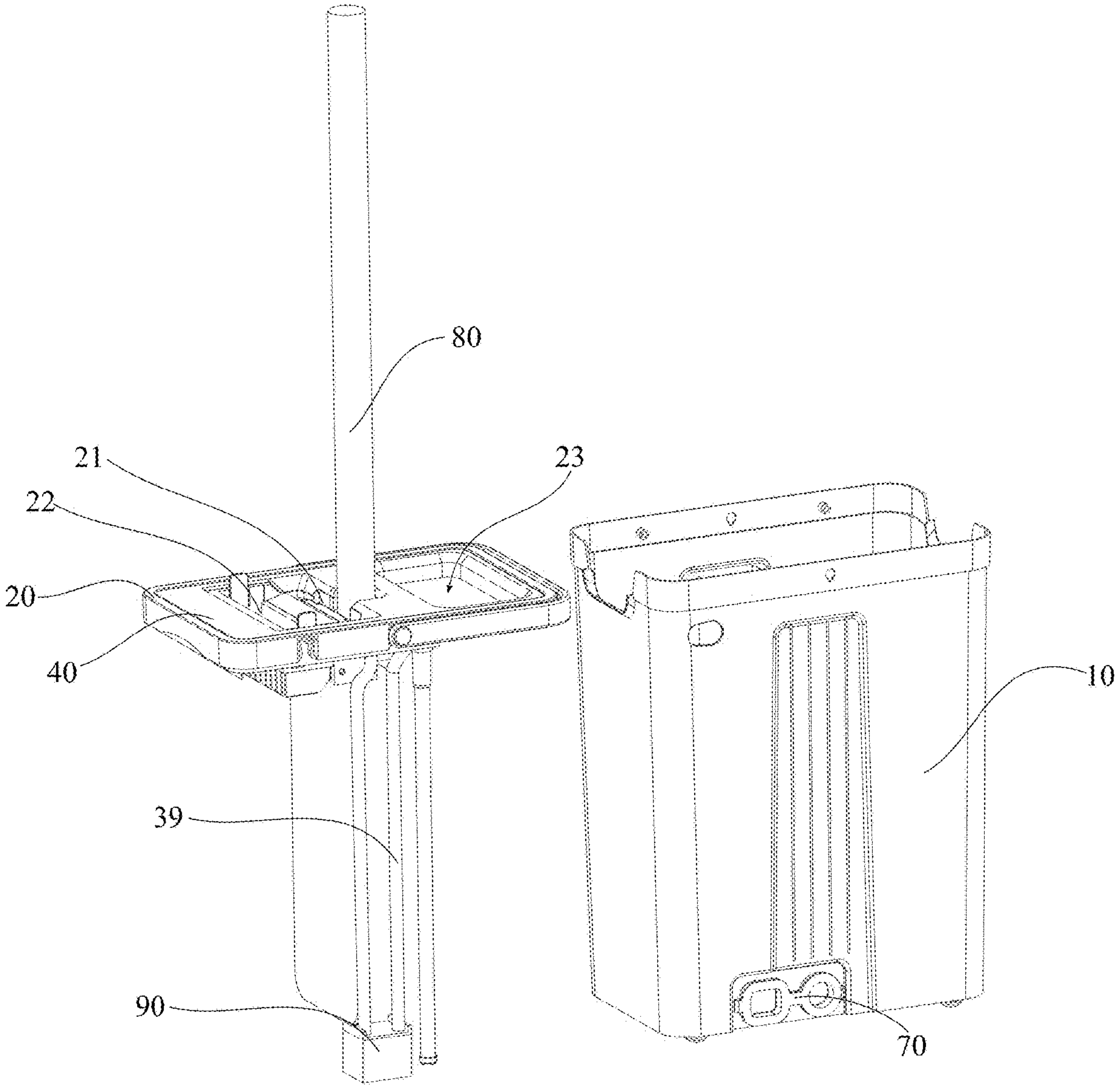
FIG. 8 is a schematic diagram of a substructure of another embodiment of a mop bucket according to the present invention.

In other embodiments, as shown in FIG. 8, the water supply assembly may be a manual water pump 90 provided in the movable chamber 14, and the manual water pump 90 is communicated with both the water spray pipe 32 and the clean water chamber 15 by the conduit 39. When the user inserts the mop 80 into the movable chamber 14, the mop presses the manual water pump 90, so as to pump the clean water in the clean water chamber 15 and guide the water to the water spray pipe 32 for spraying, thereby rinsing the mop 80.

Further, as shown in FIGS. 1 to 6, the main control module includes a main control board 37 provided in the mounting shell 35 and a key 38 connected to the main control board 37, the key 38 is mounted on the mounting shell 35, and the bucket body 10 is provided with an operation hole 16 corresponding to the key 38. In this embodiment, the main control board 37 of the main control module is mounted inside the mounting shell 35, and the working states of various components in the mop bucket, such as the starting and stopping functions of the water pumping device 36, are controlled by a circuit connection. The key 38 connected to the main control board 37 is positioned on the mounting shell 35, so that the user can press the control button to start or stop the spraying of clean water. Meanwhile, an operation hole 16 provided on the bucket body 10 is butted with the key 38, so that the user can easily press the button and interact with the main control module.

Further, as shown in FIGS. 1 to 6, the mounting frame 20 is provided with a mounting groove 27 communicated with the dirty water chamber 13, one side of the first scraper plate 31 is fixed in the mounting groove 27 by a rotating shaft, and the other side extends out of the mounting groove 27 and is positioned above the movable chamber 14. In this embodiment, one side of the first scraper plate 31 is fixed in the mounting groove 27, and the other side extends out of the mounting groove 27, so that the first scraper plate 31 can flexibly rotate when in use. When the mop 80 is inserted into the movable chamber 14, the first scraper plate 31 is in contact with the mop 80 due to the abutment between the first scraper plate 31 and the mounting groove 27, so that the effect of scraping water and cleaning dirt on the surface of the mop 80 is achieved. When the mop 80 is taken out from the movable chamber 14, the mop 80 can drive the first scraper plate 31 to rotate upwards, so that the obstruction of the first scraper plate 31 to the mop 80 is effectively reduced, the user can take out the mop 80 more smoothly, and the practicability of the mop bucket is effectively improved.

Further, as shown in FIGS. 1 to 7, a first abutment plate 312 is protrudingly provided above the first scraper plate 31, and a second abutment plate 28 cooperating with the first abutment plate 312 is protrudingly provided on the mounting frame 20 on one side of the mounting groove 27 close to the dirty water chamber 13. In this embodiment, the first abutment plate 312 and the second abutment plate 28 are used to prevent the first scraper plate 31 from rotating too much and being unable to reset when the user pulls the mop 80 with force, thereby affecting the stability of the water cleaning mechanism. The first abutment plate 312 and the second abutment plate 28 are provided to effectively control the rotation angle of the first scraper plate 31, so that the first scraper plate 31 is always positioned above the movable chamber 14, effectively ensuring the structural stability of the water cleaning mechanism.

Further, as shown in FIGS. 1 to 7, at least one positioning groove 311 is provided at a bottom of the first scraper plate 31, and a positioning protrusion 271 cooperating with the positioning groove 311 is protrudingly provided on a bottom wall of the mounting groove 27. In this embodiment, the cooperation between the positioning groove 311 and the positioning protrusion 271 further ensures the stability and accuracy of the first scraper plate 31 during mounting and use. Specifically, when the first scraper plate 31 is mounted, the positioning groove 311 cooperates with the positioning protrusion 271 of the mounting groove 27, so that the first scraper plate 31 can be accurately mounted at a designated position. When the first scraper plate 31 is subjected to external force during the cleaning process, the cooperation between the positioning groove 311 and the positioning protrusion 271 can effectively prevent the scraper plate from displacement or swinging, which ensures stable and consistent water scraping action, thereby effectively improving the structural stability of the cleaning mechanism.

Further, as shown in FIGS. 1 to 6, the mop bucket further includes a cover body 40 arranged on the mounting frame 20, the cover body 40 is arranged above the water spray pipe 32, and the cover body 40 is provided with an operation opening at a position corresponding to the first operation opening 21. In this embodiment, the cover body 40 covers the water spray pipe 32, which further enhances the sealing performance of the entire device and reduces the risk of liquid leakage.

Meanwhile, the arrangement of the cover body 40 also protects the internal structure in the mounting space 26 and prolongs the service life of the device.

Further, as shown in FIGS. 1 to 6, the mounting frame 20 and the cover body 40 are provided with a second operation opening 22 communicated with the dirty water chamber 13, and a second scraper plate 41 inclined towards the dirty water chamber 13 is provided between the first operation opening 21 and the second operation opening 22 of the cover body 40. In this embodiment, the second scraper plate 41 can effectively help to clean and collect the dirty water or other impurities flowing out of the first operation opening 21. The inclined design enables the scraper plate to better guide the flow of liquid and avoid liquid accumulation or overflow, thereby improving the overall efficiency and cleaning effect.

Specifically, the second scraper plate 41 is arranged at an inclined position between the first operation opening 21 and the second operation opening 22, so that the scraper plate can form an angle with the surface of the dirty water in the bucket, and the dirty water is guided to the dirty water chamber 13 along the inclined surface of the scraper plate by gravity. The double-layer scraper plate is provided to effectively improve the cleanliness and dryness of the mop 80, thereby improving the practicality of the mop bucket.

Figure 2:
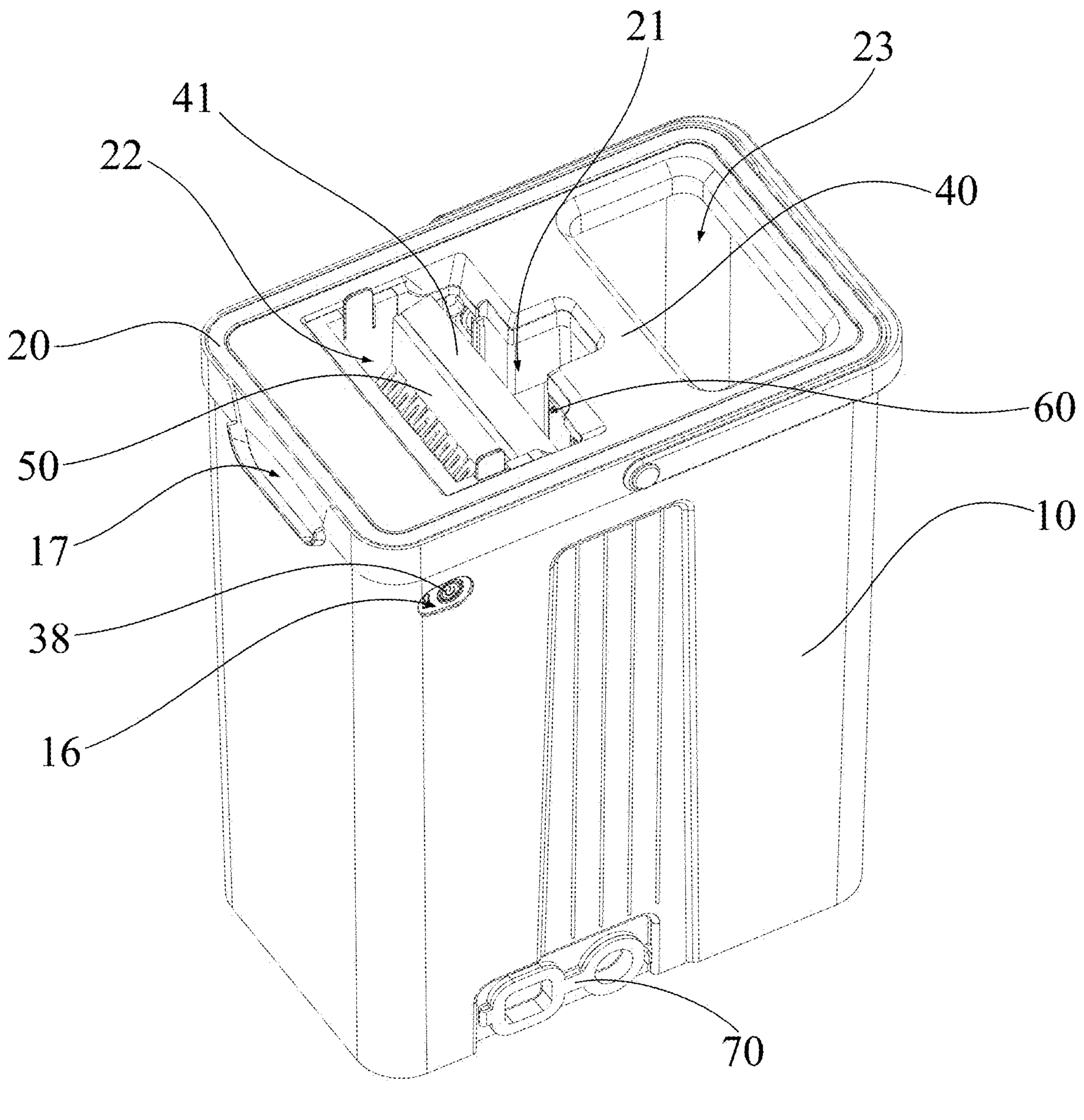
FIG. 2 is a schematic diagram of a structure of a mop bucket according to the present invention from one angle.
Figure 3:
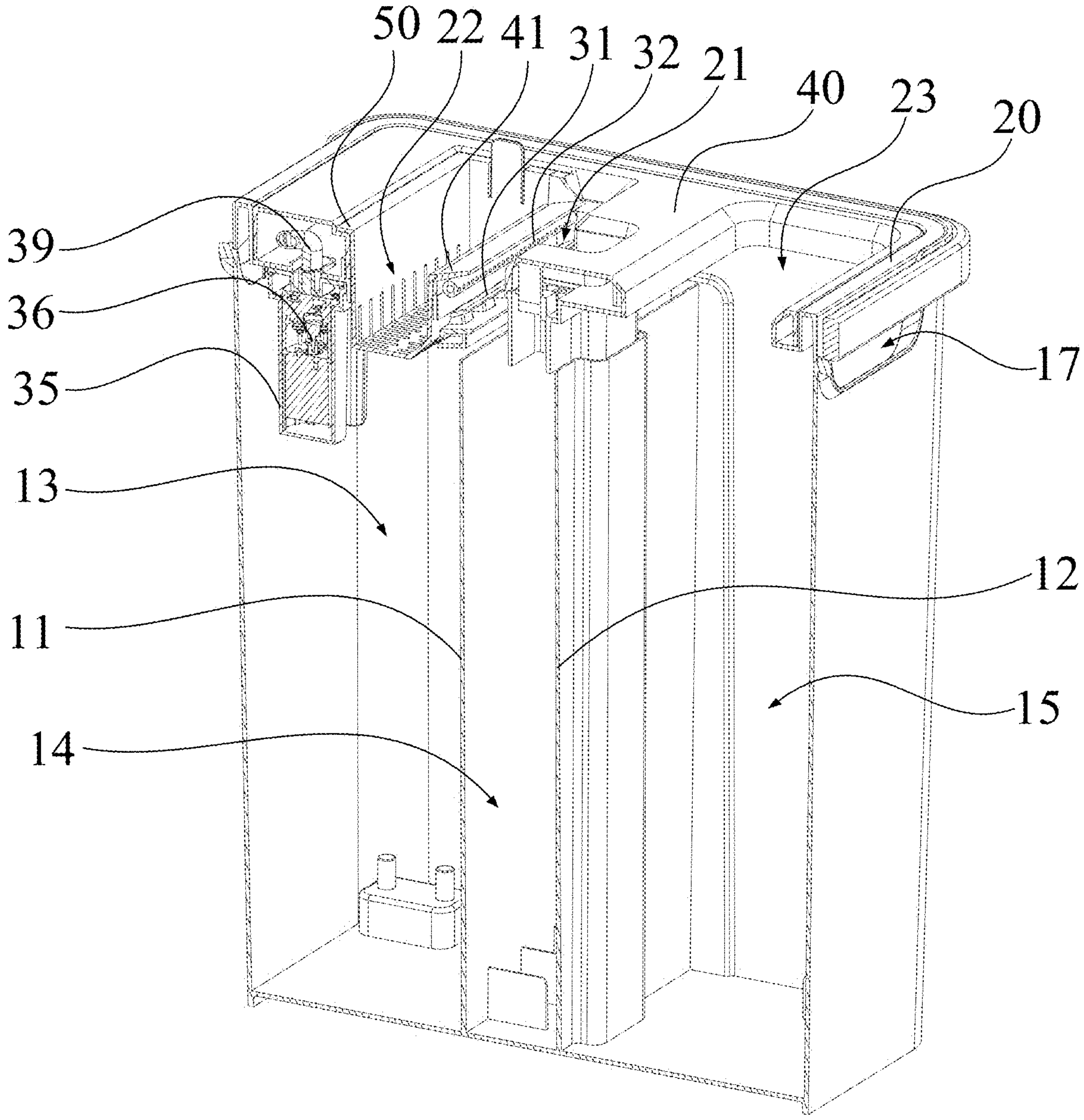
FIG. 3 is a schematic diagram of a cross-sectional structure of a mop bucket according to the present invention at one angle.
Figure 4:
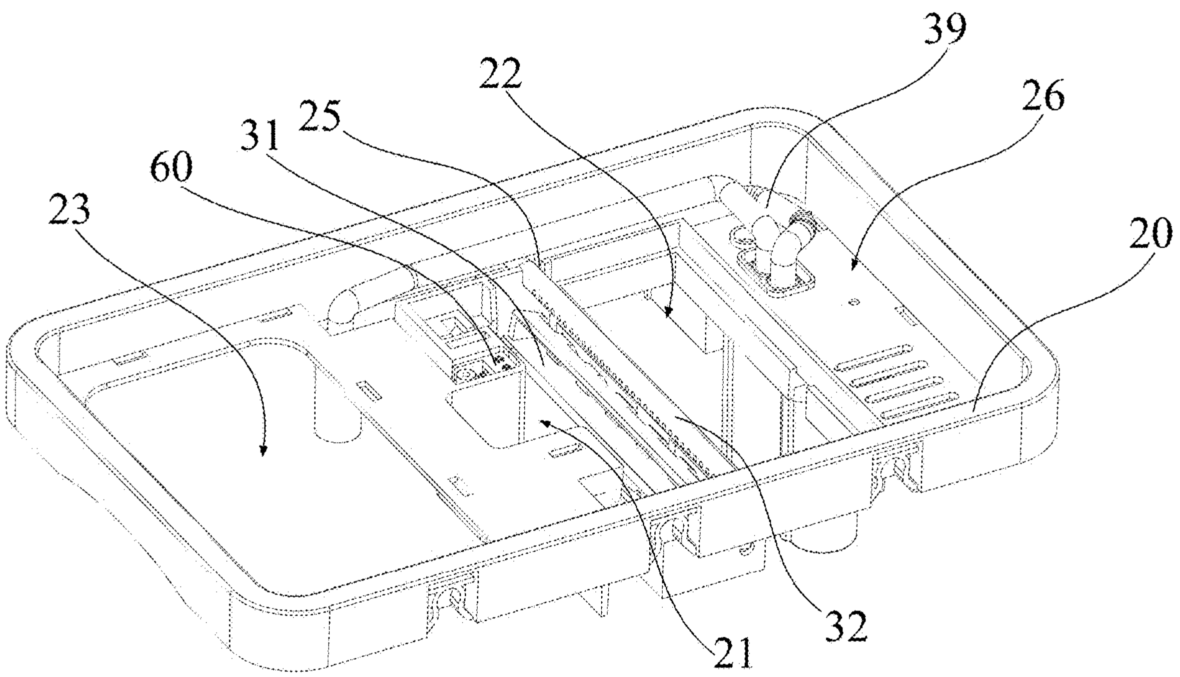
FIG. 4 is a schematic diagram of a mounting structure of a mounting frame and a cleaning mechanism.
Figure 5:
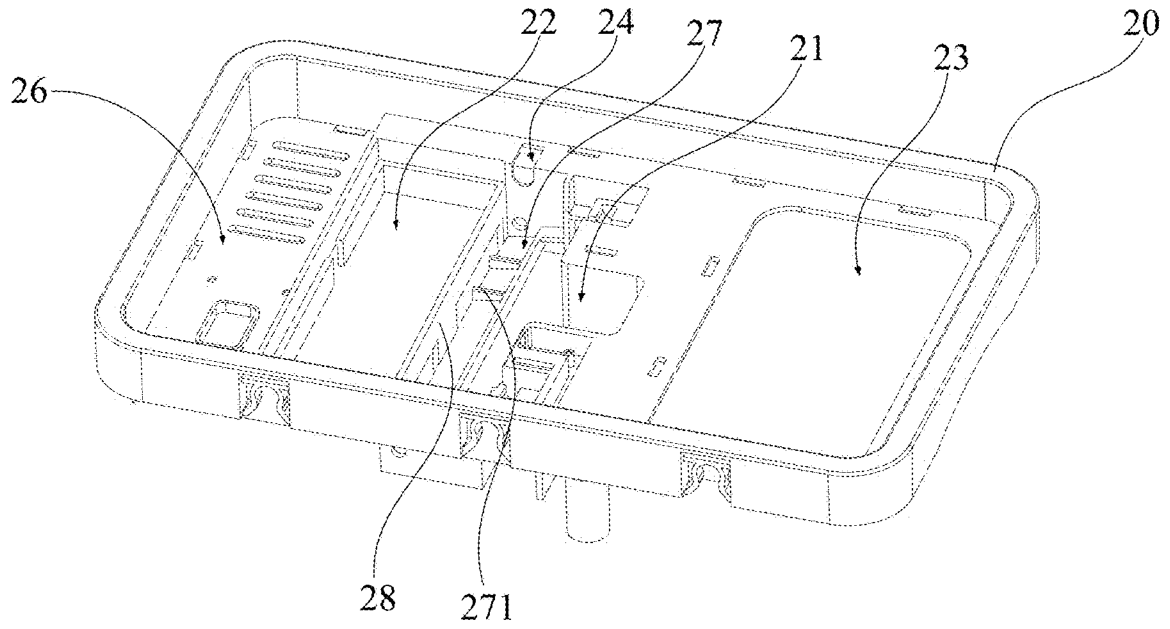
FIG. 5 is a schematic diagram of a structure of a mounting frame from one angle.
Figure 6:
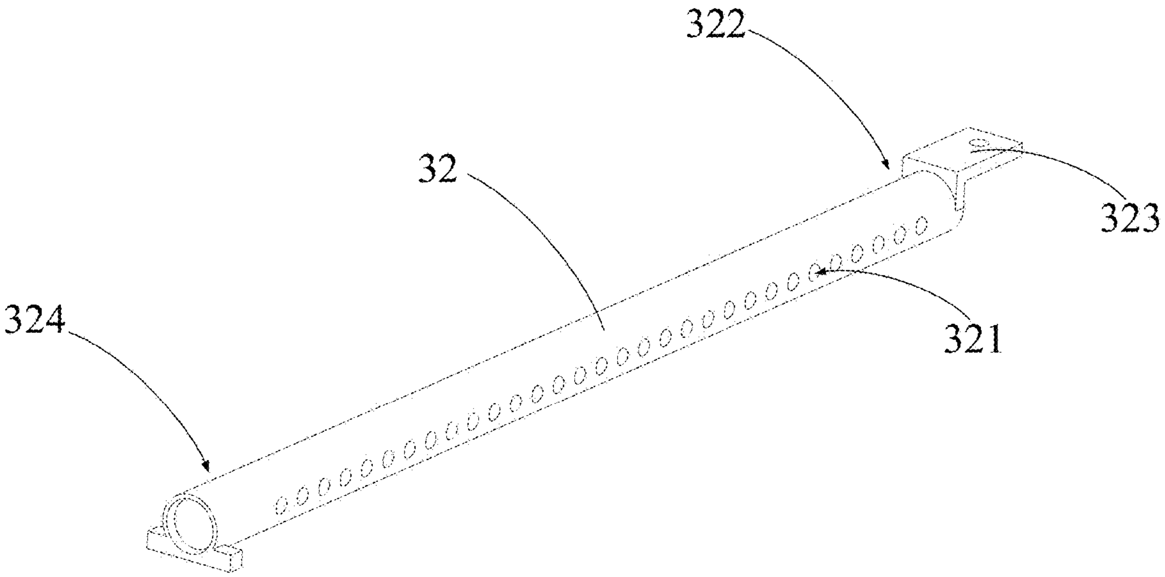
FIG. 6 is a schematic diagram of a structure of a water spray pipe from one angle.
Figure 7:
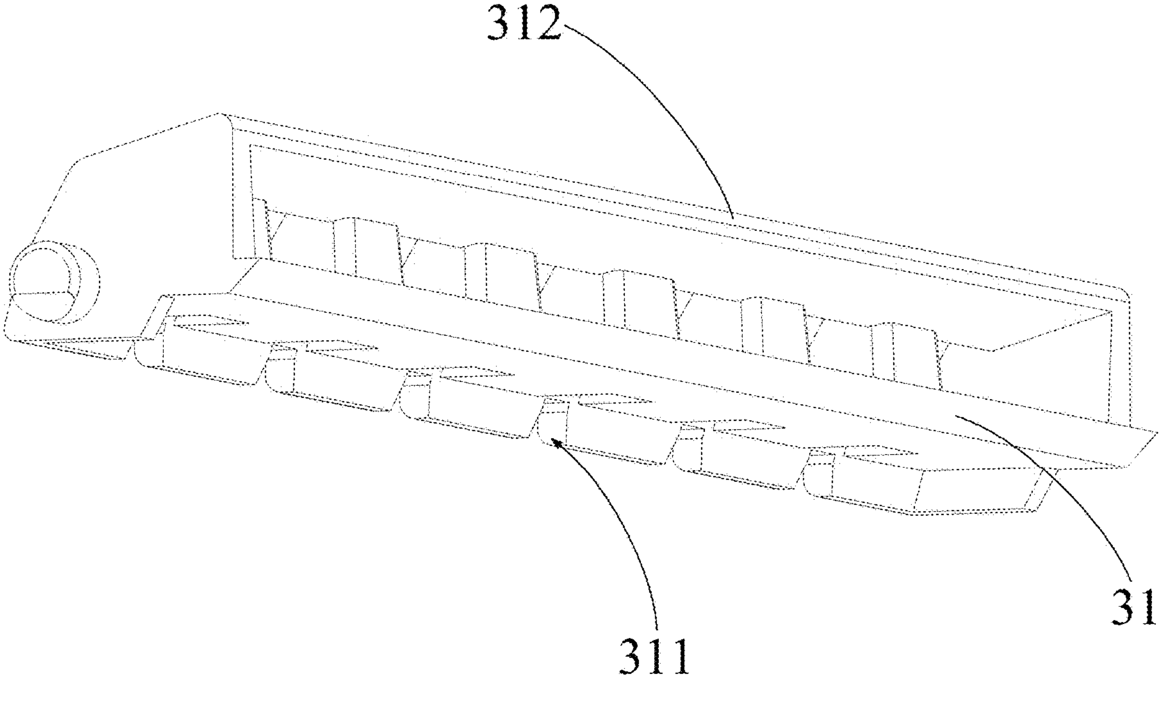
FIG. 7 is a schematic diagram of a structure of a first scraper plate from one angle.

Further, as shown in FIGS. 1 to 3, the mop bucket further includes a filter bin 50, and the filter bin 50 is mounted in the second operation opening 22 of the cover body 40 and is received below the second scraper plate 41. In this embodiment, the design of the filter bin 50 aims to filter and intercept impurities in the liquid guided out by the second scraper plate 41, so as to prevent dirt from entering the dirty water chamber 13, thereby ensuring that the liquid in the dirty water chamber 13 can be used repeatedly. The filter bin 50 is mounted in the second operation opening 22 of the cover body 40, and is positioned just below the second scraper plate 41. Therefore, when liquid in the mop bucket passes through the second scraper plate 41, residual solid impurities and dirt can be intercepted by the filter bin 50, and the water in the dirty water chamber 13 can be reused many times, so that the practicability and the maintenance convenience of the mop bucket are further improved.

Further, as shown in FIGS. 1 to 3, the mop bucket further includes a touch switch 60 electrically connected to the main control board 37, and the touch switch 60 is arranged on a peripheral wall of the first operation opening 22 of the mounting frame 20. In this embodiment, the touch switch 60 is mounted on a peripheral wall of the first operation opening 22 of the mounting frame 20 and electrically connected to the main control board 37. The touch switch 60 is mainly used to sense and monitor whether the mop 80 is inserted into the movable chamber 14 and control the water spray pipe 32 to spray water. For example, when the mop 80 is inserted into the movable chamber 14, the touch switch 60 can sense the position of the mop 80 and transmit a signal to the main control board 37, thereby starting the water pumping device 36 to control the spraying of the water spray pipe 32 to clean the mop 80. When the mop 80 is taken out of the movable chamber 14, the touch switch 60 cannot sense the position of the mop 80, a signal is transmitted to the main control board 37, the water pumping device 36 is turned off, and the spraying of the water spray pipe 32 is controlled to stop, so that the waste of water resources is effectively reduced, and the intelligence and the practicability of the mop bucket are enhanced.

It should be explained that when the touch switch 60 continuously senses that the mop 80 is inserted into the movable chamber 14, the water spray pipe 32 is controlled to spray clean water until the mop 80 is out of the sensing range of the touch switch 60, so that the mop 80 always keeps a certain humidity, and the cleaning task of the mop 80 is facilitated. When the mop 80 needs to be dried and stored, the water pumping device is only required to be turned off, and the water on the mop 80 can be scraped away through the scraper plate, so that the mop 80 is dried.

Further, as shown in FIGS. 1 to 3, a drainage valve 70 communicated with both the dirty water chamber 13 and the movable chamber 14 is provided at the bottom of the bucket body 10. In this embodiment, two drainage valves 70 are provided at the bottom of the bucket body 10, one of which is communicated with the dirty water chamber 13, and the other is communicated with the movable chamber 14. Through these drainage valves 70, the user can easily drain the liquid in the dirty water chamber 13 and the movable chamber 14. During operation, the user only needs to open the corresponding drainage valve 70 to quickly drain the dirty water or clean water, which is convenient for cleaning and maintaining the mop bucket, effectively improves the convenience and cleanliness of the mop bucket, and reduces the labor intensity of the user during the cleaning process.

In addition, at least one water pouring opening 17 is provided at the top of the bucket body 10 to enable the user to quickly clean out the water in the bucket body and facilitate the user to clean the chamber in the bucket body.

The above mentioned contents are only optional embodiments of the present invention and are not intended to limit the patent scope of the present invention, and under the invention concept of the present invention, the equivalent structural transformations made by using the contents of the specification and the drawings of the present invention, or direct/indirect applications to other related technical fields, are all included in the patent protection scope of the present invention.

What is claimed is:

1. A mop bucket, comprising:

a bucket body, wherein the bucket body has a chamber with an opening at a top, and the chamber is provided with a first partition plate and a second partition plate to separate the chamber into a dirty water chamber, a movable chamber, and a clean water chamber;

a mounting frame, wherein the mounting frame is mounted at the top of the bucket body and is provided with a first operation opening communicated with the movable chamber; and a cleaning mechanism, wherein the cleaning mechanism comprises a first scraper plate provided above the first partition plate and inclined toward the dirty water chamber, a water supply assembly, and a water spray pipe provided above the first scraper plate, the water supply assembly is used to communicate with both the clean water chamber and the water spray pipe to spray clean water in the clean water chamber toward the mop in the movable chamber by the water spray pipe;

wherein the mounting frame is provided with a mounting groove communicated with the dirty water chamber; a bottom of the first scraper plate is provided with at least one positioning groove, and at least one positioning protrusion is protrudingly provided on a bottom wall of the mounting groove, the at least one positioning protrusion engages with the at least one positioning groove to prevent displacement or swinging of the first scraper plate wherein the mop bucket further comprises a cover body arranged on the mounting frame, the cover body is arranged above the water spray pipe, and the cover body is provided with an operation opening at a position corresponding to the first operation opening:

wherein the mounting frame and the cover body are provided with a second operation opening communicated with the dirty water chamber, and a second scraper plate inclined towards the dirty water chamber is provided between the first operation opening and the second operation opening of the cover body:

wherein the mop bucket further comprises a filter bin configured to filter and intercept impurities in a liquid guided out by the second scraper plate, and the filter bin is mounted in the second operation opening of the cover body and is received below the second scraper plate.

2. The mop bucket according to claim 1, wherein the water supply assembly comprises a mounting shell provided at a bottom of the mounting frame, a water pumping device arranged in the mounting shell, and a main control module electrically connected to the water pumping device, and the water pumping device is communicated with both the water spray pipe and the clean water chamber by a conduit.

3. The mop bucket according to claim 2, wherein the main control module comprises a main control board provided in the mounting shell and a control button connected to the main control board, the control button is mounted on the mounting shell, and the bucket body is provided with an operation hole corresponding to the control button.

4. The mop bucket according to claim 3, wherein the mop bucket further comprises a touch switch electrically connected to the main control board, and the touch switch is arranged on a peripheral wall of the first operation opening of the mounting frame.

5. The mop bucket according to claim 2, wherein the water spray pipe comprises a closed end and a water inlet end communicated with the water pumping device, the closed end is provided with a fixing part, the mounting frame is provided with a fixing groove adapted to the fixing part, and the fixing part is fixed in the fixing groove.

6. The mop bucket according to claim 1, wherein one side of the first scraper plate is fixed in the mounting groove by a rotating shaft, and the other side extends out of the mounting groove and is positioned above the movable chamber.

7. The mop bucket according to claim 6, wherein a first abutment plate is protrudingly provided above the first scraper plate, and a second abutment plate cooperating with the first abutment plate is protrudingly provided on the mounting frame on one side of the mounting groove close to the dirty water chamber.

8. The mop bucket according to claim 1, wherein a drainage valve communicated with both the dirty water chamber and the movable chamber is provided at the bottom of the bucket body.

9. The mop bucket according to claim 1, wherein at least one water pouring opening is provided on the top of the bucket body.

10. The mop bucket according to claim 1, wherein the water supply assembly comprises a manual water pump provided in the movable chamber, and the manual water pump is communicated with both the water spray pipe and the clean water chamber by a conduit.

* * * * *